United States Patent
Cathro

(10) Patent No.: US 8,499,200 B2
(45) Date of Patent: Jul. 30, 2013

(54) MANAGING CODE-TRACING DATA

(75) Inventor: Ian A. Cathro, Dundee (GB)

(73) Assignee: NCR Corporation, Duluth, GA (US)

( * ) Notice: Subject to any disclaimer, the term of this patent is extended or adjusted under 35 U.S.C. 154(b) by 226 days.

(21) Appl. No.: 12/786,187

(22) Filed: May 24, 2010

(65) Prior Publication Data

US 2011/0289360 A1    Nov. 24, 2011

(51) Int. Cl.
*G06F 11/00* (2006.01)

(52) U.S. Cl.
USPC .................................. 714/45; 714/25; 714/37

(58) Field of Classification Search
USPC .................. 714/25, 27, 37, 38.1, 45
See application file for complete search history.

(56) References Cited

U.S. PATENT DOCUMENTS

| | | | |
|---|---|---|---|
| 6,934,891 B2 * | 8/2005 | Kawaguchi et al. | 714/48 |
| 7,559,053 B2 * | 7/2009 | Krassovsky et al. | 714/37 |
| 2005/0131822 A1 * | 6/2005 | Gardner | 705/43 |
| 2006/0059146 A1 * | 3/2006 | McAllister et al. | 707/6 |
| 2006/0277441 A1 * | 12/2006 | Edgar et al. | 714/38 |
| 2008/0155353 A1 * | 6/2008 | Craske | 714/45 |
| 2008/0244328 A1 * | 10/2008 | Bohizic et al. | 714/45 |
| 2009/0083182 A1 * | 3/2009 | Coventry et al. | 705/43 |
| 2009/0119548 A1 * | 5/2009 | Kollmann et al. | 714/45 |
| 2010/0281308 A1 * | 11/2010 | Xu et al. | 714/45 |

\* cited by examiner

*Primary Examiner* — Joseph D Manoskey
(74) *Attorney, Agent, or Firm* — Peter H. Priest

(57) ABSTRACT

A method of managing code-tracing data is described. The method comprises the steps of: receiving code-tracing data from an executing software component; adding the received code-tracing data to a log stored in temporary storage; detecting a property of the received code-tracing data; copying the log to non-volatile storage when the property matches a defined trigger property; and deleting contents of the log according to a caching policy when the property does not match a defined trigger property.

17 Claims, 1 Drawing Sheet

MANAGING CODE-TRACING DATA

FIELD OF INVENTION

The present invention relates to managing code-tracing data.

BACKGROUND OF INVENTION

To improve fault detection in software, software engineers typically add instrumentation code to software components (application software, drivers, and the like) so that code-tracing data is generated automatically by the instrumentation code as the software components execute. The instrumentation code typically generates code-tracing data when certain functions are performed, status changes occur, and the like. A trace manager is used to store the code-tracing data generated by the instrumentation code in a log file.

If a fault occurs, then the log file can be analyzed to identify the cause of the fault. For example, the code-tracing data may indicate if any unexpected events occurred, or if any expected events did not occur, prior to the fault occurring.

Although generating and storing code-tracing data has clear advantages, there are also problems associated with managing code-tracing data.

One problem is that instrumentation code can produce a large amount of code-tracing data every second, which consumes valuable storage space and may slow down the operation of the software as the log file is written to disk. Furthermore, the large quantity of code-tracing data produced makes it difficult to identify the code-tracing data that is relevant to an error. Other errors may be detected that are irrelevant to, and may obscure, the error being targeted.

It would be advantageous to overcome or mitigate some of these disadvantages, or other disadvantages associated with managing code-tracing data.

SUMMARY OF INVENTION

Accordingly, the invention generally provides methods, systems, apparatus, and software for managing code-tracing data.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a method of managing code-tracing data, the method comprises the steps of:

receiving code-tracing data from an executing software component;

adding the received code-tracing data to a log stored in temporary storage;

detecting a property of the received code-tracing data;

copying the log to non-volatile storage when the property matches a defined trigger property; and deleting contents of the log according to a caching policy when the property does not match a defined trigger property.

The defined trigger property may comprise (i) a defined reference and/or (ii) a defined category.

The defined reference may identify the software containing the instrumentation code that generated the defined category.

The defined reference may be associated with a component (such as a service provider, or a driver), an object within a component (such as a framework, device controls, or the like), or code within an object (such as a function or routine). The defined reference may be selected at the desired level of granularity.

The defined category may be selected from: an error category, a function entry point category, a function exit point category, a general category, an information category, a warning category, an event category, and the like. In some embodiments, it may be desirable to use an error category as the defined category. In some embodiments, it may be desirable for the defined trigger property to consist of an error category, so that copying the log to non-volatile storage will be triggered whenever an error category is created by any instrumentation code.

The caching policy may be based on a fixed number of bytes stored in the log, so that the earliest code-tracing data is deleted whenever the log reaches the fixed number of bytes.

The caching policy may be based on time, so that code-tracing data is deleted whenever it is older than a fixed time period, for example, two hours.

The caching policy may be based on the number of entries stored, so that the earliest code-tracing data is deleted whenever the log reaches the fixed number of entries.

The caching policy may be based on a combination of some or all of the preceding caching policies.

The step of deleting contents of the log according to a caching policy when the property does not match a defined trigger property may involve not deleting any contents of the log if the caching policy does not require any contents to be deleted.

The step of detecting a property of the received code-tracing data and the step of copying the log to non-volatile storage when the property matches a defined trigger property, may be implemented prior to, during, or subsequent to the step of adding the received code-tracing data to the log stored in temporary storage.

The temporary storage may be computer memory (such as DRAM).

The non-volatile storage may be one or more magnetic or optical disks.

The method may be implemented when at least one client (or session) does not request code-tracing data. Alternatively, the method may be implemented even if all clients (all sessions) request code-tracing data.

The method may further comprise permanently storing code-tracing data in a file for any client (such as a thread in the software component) requesting such storage. This file is separate from the log, and is not subject to the caching policy.

The step of deleting contents of the log according to a caching policy when the property does not match a defined trigger property may be implemented prior to, during, or subsequent to the step of detecting a property of the received code-tracing data.

According to a second aspect there is provided a system for managing code-tracing data, the system comprising:

a trace manager arranged to (i) receive code-tracing data from an executing software component, (ii) add the received code-tracing data to a log, (iii) detect a property of the received code-tracing data, (iv) copy the log to non-volatile storage if the property matches a defined trigger property; and (v) delete contents of the log according to a caching policy.

The trace manager may comprise a software component.

The trace manager may be implemented by a CEN XFS compliant software component. Alternatively, the trace manager may be implemented by a proprietary code-tracing data storage component.

The executing software component that transmits code-tracing data may comprise an XFS service provider.

According to a third aspect there is provided a computer program comprising program instructions for executing the steps of the first aspect.

The computer program may be stored on a computer readable medium, such as a computer memory, an input/output data storage device (such as a magnetic or optical disk, or a Flash storage drive) or the like.

According to a fourth aspect there is provided a computer data signal embodied on a carrier wave encoding instructions that, when executed on a processor, implement the method of the first aspect.

According to a fifth aspect there is provided a self-service terminal comprising a plurality of modules for providing transaction-related functions to a customer of the self-service terminal, and a controller coupled to the modules, and executing a runtime platform including a trace manager, the trace manager being arranged to (a) receive code-tracing data from an executing software component, (b) add the received code-tracing data to a log stored in volatile storage, (c) detect a property of the received code-tracing data, (d) copy the log to non-volatile storage if the property matches a defined trigger property; and (e) delete contents of the log according to a caching policy.

According to a sixth aspect there is provided a method of managing code-tracing data, the method comprises the steps of:

receiving code-tracing data from an executing software component;

storing the received code-tracing data in a cache as part of a trace log;

detecting a category of the received code-tracing data;

copying the trace log to non-volatile storage when the received code-tracing data relates to an error category; and deleting the oldest contents of the trace log when a predetermined criterion is satisfied.

For clarity and simplicity of description, not all combinations of elements provided in the aspects recited above have been set forth expressly. Notwithstanding this, the skilled person will directly and unambiguously recognize that unless it is not technically possible, or it is explicitly stated to the contrary, the consistory clauses referring to one aspect are intended to apply mutatis mutandis as optional features of every other aspect to which those consistory clauses could possibly relate.

These and other aspects will be apparent from the following specific description, given by way of example, with reference to the accompanying drawings.

DETAILED DESCRIPTION

Figure 1:
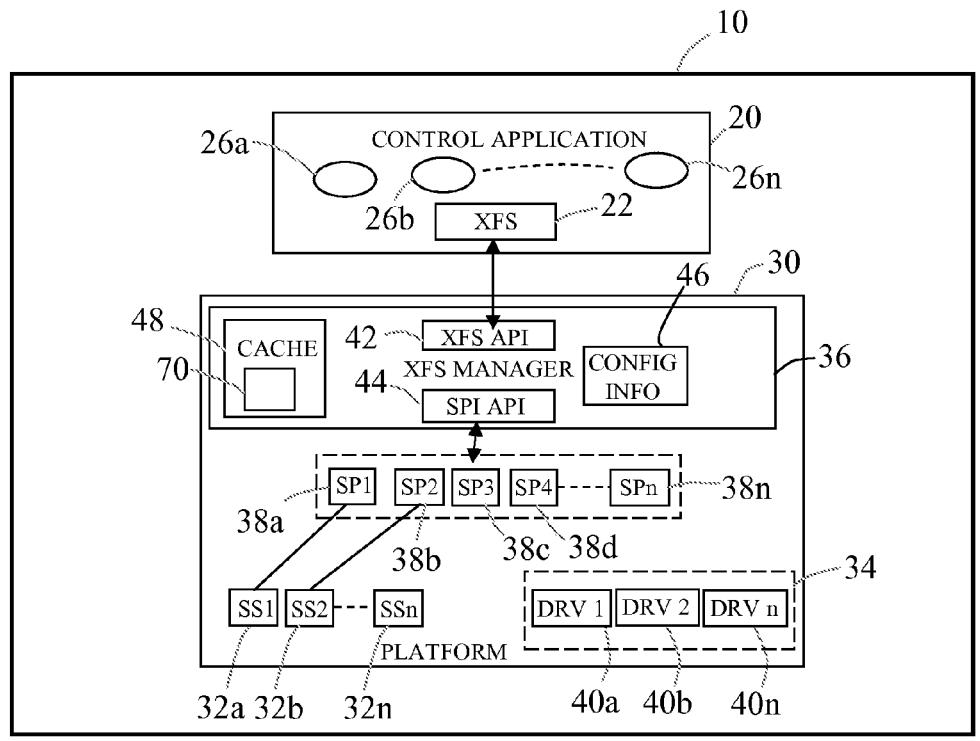
FIG. 1 is a simplified schematic diagram of an SST memory executing software components according to an embodiment of the present invention.

Reference will now be made to FIG. 1, which is a simplified schematic diagram showing an SST memory 10 executing software components. In this embodiment the SST is an ATM. The software components comprise: a control application 20 and a runtime platform 30.

The Control Application 20

As is known in the art, the control application 20 presents a sequence of screens on an ATM display to a customer at the ATM, collates information from the customer (for example, customer account information from a customer's ATM card, transaction request, and the like), obtains authorization for a transaction request from a remote authorization host (not shown), and instructs modules within the ATM, as needed, to fulfill an authorized transaction.

As is also known in the art, the control application 20 also comprises a conventional CEN XFS interface 22 for communicating with a trace manager in the form of an XFS manager (described as box 36 below) in the runtime platform 30. CEN is the European Committee for Standardisation, and XFS is the eXtensions for Financial Services standard. The current version of this CEN XFS standard is v.3.10.

It should be appreciated that the XFS manager 36 provides many more functions than merely managing traces. For example, the XFS manager 36 provides services to clients (applications or threads of applications).

The control application 20 is capable of creating and maintaining multiple sessions, as illustrated by ellipses 26a, b, n.

The Runtime Platform 30

The runtime platform 30 comprises proprietary device drivers, 32a, b, . . . n (only three of which are illustrated), an operating system 34, an XFS manager 36, and XFS service providers 38a, b, c, d . . . n.

In this embodiment, the operating system 34 is a Windows XP (trade mark) operating system, available from Microsoft Corporation (trade mark). The operating system 34 includes a plurality of standard device drivers 40a, b, . . . n for interfacing with standard computing devices such as a magnetic disk drive, a display, USB ports, serial ports, a parallel port, and such like. As is well known in the art, the operating system 34 is responsible for memory, process, task, and disk management, and includes routines for implementing these functions.

The proprietary device drivers 32 are a set of APTRA (trade mark) XFS components, available from NCR Corporation, 3097 Satellite Blvd., Duluth, Ga. 30096, U.S.A. The device drivers 32 provide a range of programming facilities specific to self-service terminal devices and services.

One function of the device drivers 32 is to enhance the operating system 34 so that the operating system 34 and device drivers 32 together provide high level access to all of the devices and modules, including both standard home computing devices (via the operating system 34), and XFS computing devices (via the run-time components 32). Thus, the combination of the device drivers 32 and the operating system 34 can be viewed as providing a complete ATM operating system.

The service providers 38 provide a vendor-independent interface to the device drivers 32.

The device drivers 32 interface with self-service specific devices, and include support files (not shown), to allow each device or module to be operated, tested, maintained, and configured. Although only a few device drivers 32a, b are shown, there are many device drivers 32, one for each self-service specific module, such as a card reader (not shown), a receipt printer (not shown), an encrypting keypad (not shown) and FDKs (not shown), and a cash dispenser (not shown). Furthermore, there are many more devices and modules in an ATM than those described herein, for example there are more standard computing devices such as USB ports and a parallel port, there may also be more self-service devices and modules, such as a statement printer, a cash accept module, and the like. These devices and modules are not discussed herein because they are not essential to an understanding of the invention.

The XFS manager 36 includes an XFS application programming interface (API) 42, a service provider interface (SPI) 44, configuration data 46, and a cache 48.

The service providers 38 communicate with the XFS manager 36 and also with the self-service device drivers 32 and the standard device drivers 40 associated with the modules. Suitable service providers are available from NCR Corporation, Satellite Blvd., Duluth, Ga. 30096, U.S.A.

The service providers 38 provide a high level of abstraction to allow the control application 20 to issue standard XFS commands to request functions and services. The service providers 38 translate these XFS commands for the particular device drivers 32,40 used in the runtime platform 30. Each service provider 38 is typically associated with one module (such as a cash dispenser module).

Each of the multiple sessions 26 is capable of initiating and maintaining independent communication with the same service provider 38.

Figure 2:
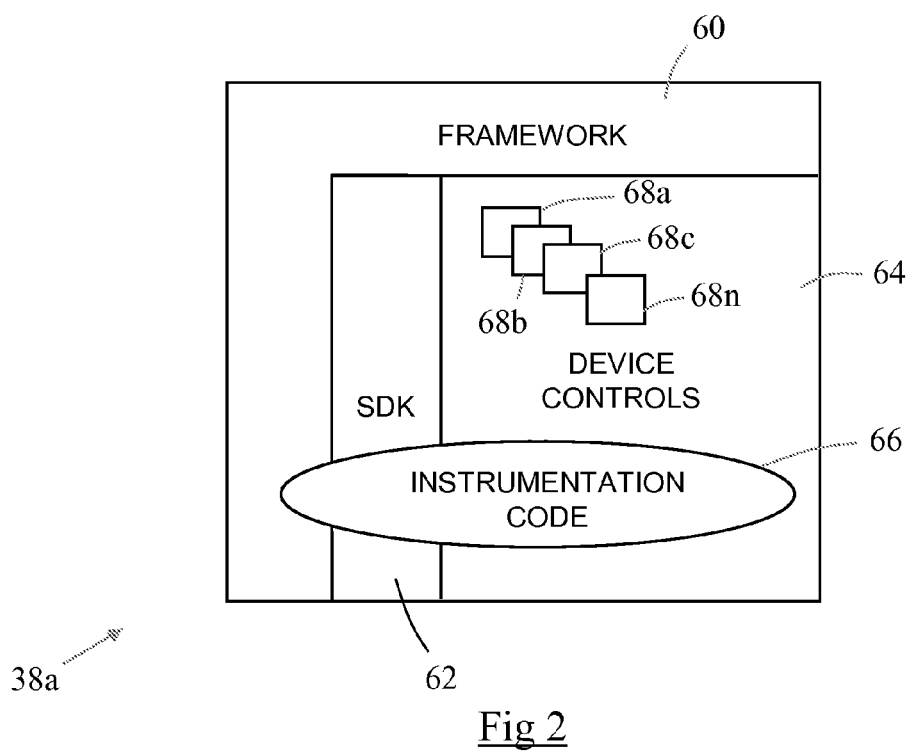
FIG. 2 is a simplified schematic diagram illustrating one of the software components (a service provider) executing in the SST memory of FIG. 1.

Reference will now be made to FIG. 2, which is a block diagram illustrating one of the service providers 38a in more detail. In this embodiment, service provider 38a is associated with a cash dispenser.

The cash dispenser service provider 38a comprises a framework portion 60 (which is identical for all of the service providers 38), a software development kit (SDK) portion 62 (which is also identical for all service providers 38), and a device control portion 64. The cash dispenser service provider 38a is a component (according to the terminology used herein), and the framework portion 60, SDK portion 62, and device control portion 64, are all objects (according to the terminology used herein). As is known in the art, when each of these objects registers with the XFS manager 36, each object provides the XFS manager 36 with a reference. This reference identifies the object to the XFS manager 36.

The framework portion 60 provides the code necessary to handle communications in XFS format.

The SDK portion 62 provides a set of application programming interfaces (APIs) between the framework portion 60 and the device control portion 64. The SDK portion 62 ensures that the device control portion 64 is implemented to a specific contract so that the device control portion 64 operates in unison with the framework portion 60.

The device control portion 64 is unique for each service provider 38 and includes device driver functionality for the device associated with that service provider 38. The device control portion 64 also includes function-implementing code 68a, b, c, . . . n.

The function-implementing code 68 is illustrated as a plurality of individual boxes. This is merely to illustrate that there is code within the service provider 38a providing discrete functions implemented by the cash dispenser.

The framework portion 60, the SDK portion 62, and the device control portion 64 all include instrumentation code 66, which is illustrated in FIG. 2 as an ellipse.

In this embodiment, function-implementing code 68a implements a banknote dispense function and function-implementing code 68b implements a banknote retract function.

The instrumentation code 66 provides checkpoints, trace lines, and other diagnosis tools. Whenever one of the functions (for example, the banknote dispense function 68a) is called, then a trace line in the instrumentation code 66 for that function creates data to indicate (i) the client thread that called the function, (ii) when the function was called, (iii) the name of the function called, and (iv) the names and values of the parameters input to the function, and output from the function.

The service provider 38a creates a code-tracing object populated with (i) the created data, (ii) the reference identifying the object (for example, the device control portion 64) incorporating the trace line in the instrumentation code 66 that created the code-tracing object, and (iii) a category for the created data.

The reference is included so that the code-tracing object identifies the software that caused the code-tracing object to be created; or more accurately, the software containing the instrumentation code that created the code-tracing object).

The category indicates what type of data is included in the code-tracing object. For example, the category may be one of the following: entry point, exit point, general data, information, warning, or error. The category is created automatically based on the type of instrumentation code that created the data.

The category is a property of the code-tracing object. The reference is also a property of the code-tracing object.

The service provider 38a pushes this created code-tracing object (which contains code-tracing data) to the XFS manager 36 using a conventional XFS command (WFMOutputTraceData).

Each session 26 can request the XFS manager 36 to store the code-tracing data (which is data extracted from the code-tracing object) in a log file using either the WFSSetTraceLevel XFS API call or when a session is opened with the service provider 38a. This log file is typically stored on permanent I/O storage within the ATM (not shown), such as a disk drive. The configuration information 46 stores the name and path of this log file, which by default is "xfstrace.log". However, due to the adverse impact in performance caused by saving the code-tracing data in a log file, the sessions 26 may not request the XFS manager 36 to save the code-tracing data.

In this embodiment, even if the sessions 26 do not request the XFS manager 36 to save the code-tracing data as a log file, the XFS manager 36 saves the code-tracing data to a cache 48 (FIG. 1) within the ATM memory 10. The code-tracing data that is stored in the cache 48 is referred to herein as buffered data 70. Since the code-tracing data is being saved to main memory 10 rather than I/O storage, any adverse effect on performance is minimal.

When the XFS manager 36 stores the code-tracing data to the memory 10, it detects from the code-tracing object the properties of the code-tracing data, including the reference and the category to which the code-tracing data belongs.

If one or more of the properties matches a defined trigger property, then the XFS manager 36 transfers the buffered data 70 from memory 10 to I/O storage for subsequent retrieval and analysis. In this embodiment the defined trigger property is that the category is an "error" category, regardless of the value of the reference property.

To prevent the buffered data 70 from getting too large, the XFS manager 36 implements a caching policy. In this embodiment, the caching policy is based on the number of bytes stored in the memory 10. The XFS manager 36 does not allow the buffered data 70 to exceed the predefined data size limit. In this embodiment, the predefined data size limit is one megabyte. If the buffered data 70 approaches this limit, then the XFS manager 36 deletes the earliest entries to ensure that this limit is not exceeded.

The buffered data 70 is separate from, and independent of, any log file (such as "xfstrace.log") stored in response to a session 26 requesting permanent storage of code-tracing data.

The service providers 38 are typically able to maintain multiple independent sessions, so that if one session 26a requests storage of code-tracing data, but another session 26b requests that code-tracing data should not be stored, the XFS manager 36 maintains the buffered data 70 in the cache 48 for code-tracing data relevant to the session 26b that does not want permanent storage; and maintains a disk file (such as "xfstrace.log" stored on I/O storage) for code-tracing data relevant to the session 26a that does want permanent storage. Since the two sessions 26a, b may be performing different functions, different instrumentation code may be executed for each, so the buffered data 70 may be different to the code-tracing data in the "xfstrace.log" file.

If an error occurs, then the buffered data 70 is written to disk as a file (referred to as the buffer file), and a person can analyze both the xfstrace.log file (for session 26a) and the buffered file (for session 26b). This is useful because prior art systems would not store the code-tracing data associated with session 26b, even though the error may have been caused by that session 26b rather than the session 26a that requested storage of the code-tracing data.

It will now be appreciated that the above embodiment has the advantage that code-tracing data that would otherwise be discarded is retained, but kept to a manageable size based on deleting the oldest code-tracing data. This ensures minimal impact on performance. Furthermore, if an error occurs, the code-tracing data prior to that error occurring is copied to permanent storage for subsequent analysis so that the most important data is not lost.

This embodiment ensures that trace information (code-tracing data) leading up to an error in a real-time software component can always be obtained, even if storage of code-tracing data has not been requested.

Various modifications may be made to the above described embodiment within the scope of the invention, for example, in other embodiments, the SST may not implement the CEN XFS standard. In such embodiments, a proprietary trace manager may be provided.

In other embodiments, the self-service terminal may be an information kiosk, a financial services centre, a bill payment kiosk, a lottery kiosk, a postal services machine, a check-in and/or check-out terminal such as those used in the retail, hotel, car rental, gaming, healthcare, and airline industries, or the like.

In other embodiments, different caching policies may be used, based on how long the code-tracing data has been stored, the number of entries stored, a combination of these, or any other convenient policy. Even if the total storage size caching policy is used, the predefined log file size limit may be different to (larger or smaller than) one megabyte.

In other embodiments, different categories may be used than those described above. A higher or lower number of categories may be used.

In other embodiments, different properties may be used than those described above.

A defined trigger property may comprise a sequence of multiple properties, each property linked by a Boolean relationship (such as AND, OR, NOT, and the like) to the other properties in the sequence.

In other embodiments, a property other than, or properties in addition to, an "error" category may be used as a trigger property. For example, in other embodiments, a defined trigger property may comprise (i) a specific reference (for example, corresponding to the device control portion 64) and (ii) an error category, so that storage of the log 70 is only triggered by an error category for object data created by instrumentation code within the device control portion 64. In other embodiments, there may be a Boolean OR relationship between different properties, so that a trigger occurs if either property is present.

In the above embodiment, the software components including instrumentation code comprise service providers. In other embodiments, the software components including instrumentation code may comprise applications executing in the environment of an operating system and/or a runtime platform.

The steps of the methods described herein may be carried out in any suitable order, or simultaneously where appropriate. The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

Unless otherwise indicated by the context, the terms "a" and "an" are used herein to denote at least one of the elements, integers, steps, features, operations, or components mentioned thereafter, but do not exclude additional elements, integers, steps, features, operations, or components.

What is claimed is:

1. A method of managing code-tracing data, the method comprising the steps of:
   receiving first code-tracing data from a first executing software component in response to a first session requesting permanent storage of code-tracing data;
   storing the first code-tracing data in permanent storage;
   receiving second code-tracing data from a second executing software component in response to a second session not requesting permanent storage of code-tracing data;
   adding the second code-tracing data to a log stored in temporary storage;
   detecting a property of the second code-tracing data;
   copying the log to non-volatile storage when the property matches a defined trigger property; and
   deleting contents of the log according to a caching policy when the property does not match a defined trigger property.

2. A method according to claim 1, wherein the defined trigger property is an error category.

3. A method according to claim 1, wherein the caching policy is based on a fixed number of bytes stored in the log, so that the earliest code-tracing data is deleted whenever the log reaches the fixed number of bytes.

4. A method according to claim 1, wherein the caching policy is based on time, so that code-tracing data is deleted whenever it is older than a fixed time period.

5. A method according to claim 1, wherein the caching policy is based on the number of entries stored, so that the earliest code-tracing data is deleted whenever the log reaches a fixed number of entries.

6. A method according to claim 1, wherein comprises a sequence of multiple properties, each property linked by a Boolean relationship to the other properties in the sequence.

7. A method according to claim 1, wherein the temporary storage comprises computer memory.

8. A method according to claim 1, wherein the non-volatile storage comprises one or more magnetic disks.

9. A method according to claim 1, wherein the first executing software implements a banknote dispense function, and the second executing software implements a banknote retract function.

10. A method according to claim 1, wherein the method further comprises permanently storing code-tracing data in a separate file, without implementing any caching policy for this file, for any client requesting such storage.

11. A system for managing code-tracing data, the system comprising: a processor, main memory, and a trace manager executing on said processor operating to
receive first code-tracing data from a first executing software component in response to a first session requesting permanent storage of code-tracing data,
store the first code-tracing data in permanent storage,
receive second code-tracing data from a second executing software component in response to a second session not requesting permanent storage of code-tracing data,
add the received code-tracing data to a log stored in temporary storage,
detect a property of the received code-tracing data,
copy the log to permanent storage if the property matches a defined trigger property; and
delete contents of the log according to a caching policy.

12. A system according to claim 11, wherein the trace manager comprises a CEN XFS manager.

13. A system according to claim 12, wherein each of the executing software components are embodied as XFS service providers.

14. A non-transitory computer readable storage medium with a computer program stored thereon comprising program instructions for executing the steps of:
receiving first code-tracing data from a first executing software component in response to a first session requesting permanent storage of code-tracing data;
storing the first code-tracing data in permanent storage;
receiving second code-tracing data from a second executing software component in response to a second session not requesting permanent storage of code-tracing data;
adding the second code-tracing data to a log stored in temporary storage;
detecting a property of the second code-tracing data;
copying the log to non-volatile storage when the property matches a defined trigger property; and
deleting contents of the log according to a caching policy when the property does not match a defined trigger property.

15. A self-service terminal comprising a plurality of modules for providing transaction-related functions to a customer of the self-service terminal, and a controller coupled to the modules, and executing a runtime platform including a trace manager, the trace manager being arranged to
(a) receive code-tracing data from an executing software component in response to a session not requesting permanent storage of code-tracing data,
(b) add the received code-tracing data to a log stored in volatile storage,
(c) detect a property of the received code-tracing data,
(d) copy the log to non-volatile storage when the property matches a defined trigger property; and
(e) delete contents of the log according to a caching policy.

16. The self-service terminal of claim 15, wherein the executing software component implements a banknote dispense function.

17. The self-service terminal of claim 15, wherein the defined trigger property is an error.

* * * * *